US012608574B2

(12) United States Patent
Sindelar et al.

(10) Patent No.: US 12,608,574 B2
(45) Date of Patent: Apr. 21, 2026

(54) TRANSACTION CARDS

(71) Applicant: JPMORGAN CHASE BANK, N.A., New York, NY (US)

(72) Inventors: Sara Sindelar, Manhattan, NY (US); Dylan Muhlstock, Stamford, CT (US); Howard Spector, Street, MD (US); Timothy Ludwig, Glen Mills, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/606,663

(22) Filed: Mar. 15, 2024

(65) Prior Publication Data

US 2024/0311602 A1 Sep. 19, 2024

Related U.S. Application Data

(60) Provisional application No. 63/490,313, filed on Mar. 15, 2023.

(51) Int. Cl.
| | |
|---|---|
| *G06K 19/04* | (2006.01) |
| *G06K 19/077* | (2006.01) |
| *G06Q 20/34* | (2012.01) |

(52) U.S. Cl.
CPC ....... *G06K 19/042* (2013.01); *G06K 19/0772* (2013.01); *G06Q 20/341* (2013.01)

(58) Field of Classification Search
CPC . G06K 19/042; G06K 19/0772; G06Q 20/341
USPC .......................................................... 235/380
See application file for complete search history.

(56) References Cited

U.S. PATENT DOCUMENTS

| | | | | |
|---|---|---|---|---|
| 5,969,951 | A * | 10/1999 | Fischer | G06K 19/07745 |
| | | | | 257/679 |
| 11,755,873 | B1 * | 9/2023 | Finn | G06K 19/07749 |
| | | | | 235/492 |
| 2017/0316300 | A1 * | 11/2017 | Herslow | C25D 11/243 |
| 2021/0216838 | A1 * | 7/2021 | Finn | G06K 19/07773 |
| 2023/0169299 | A1 * | 6/2023 | Vadrevu | G06K 19/07722 |
| | | | | 235/492 |
| 2024/0185220 | A1 * | 6/2024 | Agarwal | G06Q 20/352 |

* cited by examiner

*Primary Examiner* — Ahshik Kim
(74) *Attorney, Agent, or Firm* — GREENBERG TRAURIG LLP

(57) ABSTRACT

Transaction cards are disclosed. In one embodiment, a transaction card may include: a substrate having a top surface and a bottom surface; a chip comprising a plurality of electrical contacts and positioned in the substrate below the top surface of the substrate; and a first conductive material provided between the plurality of electrical contacts and the top surface of the substrate, wherein the first conductive material provides an electrical connection to the chip such that the chip is readable by a chip reading device. The chip may not be visible from the top surface of the substrate.

18 Claims, 4 Drawing Sheets

TRANSACTION CARDS

RELATED APPLICATIONS

This application claims priority to, and the benefit of, U.S. Provisional Patent Application Ser. No. 63/490,313, filed Mar. 15, 2023, the disclosure of which is hereby incorporated, by reference, in its entirety.

BACKGROUND OF THE INVENTION

1. Field of the Invention

Embodiments are generally directed to transaction cards.

2. Description of the Related Art

EuroPay Mastercard and Visa (EMV) chip cards include an electrical connector on the front of the card so that information can be read by a card reader when the card is dipped. The electrical connector is unattractive and leaves a space in which no card art can be included.

SUMMARY OF THE INVENTION

Transaction cards are disclosed. In one embodiment, a transaction card may include: a substrate having a top surface and a bottom surface; a chip comprising a plurality of electrical contacts and positioned in the substrate below the top surface of the substrate; and a first conductive material provided between the plurality of electrical contacts and the top surface of the substrate, wherein the first conductive material provides an electrical connection to the chip such that the chip is readable by a chip reading device. The chip may not be visible from the top surface of the substrate.

In one embodiment, the first conductive material may include a plurality of pads, each of the plurality of pads may be associated with one of the plurality of electrical contacts. The plurality of pads may be separated by an insulating material.

In one embodiment, the transaction card may also include: a magnetic strip provided below the bottom surface of the substrate; and a second conductive material between the magnetic strip and the bottom surface of the substrate, wherein the second conductive material provides an electrical connection to the magnetic strip such that the magnetic strip is readable by a magnetic strip reading device. The magnetic strip may not be visible from the top surface of the substrate.

In one embodiment, the transaction card may also include an antenna between the top surface and the bottom surface of the substrate in electrical communication with the chip.

In one embodiment, wherein the first conductive material may include Silicon Carbide, titanium nitride, or tungsten carbide.

According to another embodiment, a transaction card may include: a substrate having a top surface and a bottom surface; a chip positioned in the substrate; and an antenna positioned between the top surface and the bottom surface of the substrate at a periphery of the transaction card in communication with the chip.

In one embodiment, the substrate may include a first half and a second half that are bound together. The first half and the second half are formed by three-dimensional printing. The antenna may be three-dimensional printed on to one of the first half or the second half.

In one embodiment, wherein the first half and the second half are formed by stamping.

In one embodiment, wherein the chip may be positioned in a void in the substrate.

In one embodiment, the transaction card may also include a magnetic strip positioned on the bottom surface of the substrate. The magnetic strip may be positioned in a void in the bottom surface of the substrate.

According to another embodiment, a transaction card may include: a substrate having a top surface and a bottom surface; a first chip positioned in the substrate; a second chip positioned in the substrate; an antenna positioned between the top surface and the bottom surface of the substrate; and a first switch that electrically connects the first chip to the antenna in a first position, and electrically disconnects the first chip from the antenna in a second position.

In one embodiment, the first switch electrically connects the second chip to the antenna in the second position, and electrically disconnects the second chip from the antenna in the first position.

In one embodiment, the first position may include a non-actuated position, and the second position may include an actuated position.

In one embodiment, the first chip may be provided on the top surface of the substrate, and the second chip may be provided on the bottom surface of the substrate.

In one embodiment, the transaction card may also include a second switch that electrically connects the second chip to the antenna in a first position, and electrically disconnects the second chip from the antenna in a second position. The first position may include a non-actuated position, and the second position may include an actuated position.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figures 1A, 1B, 1C:
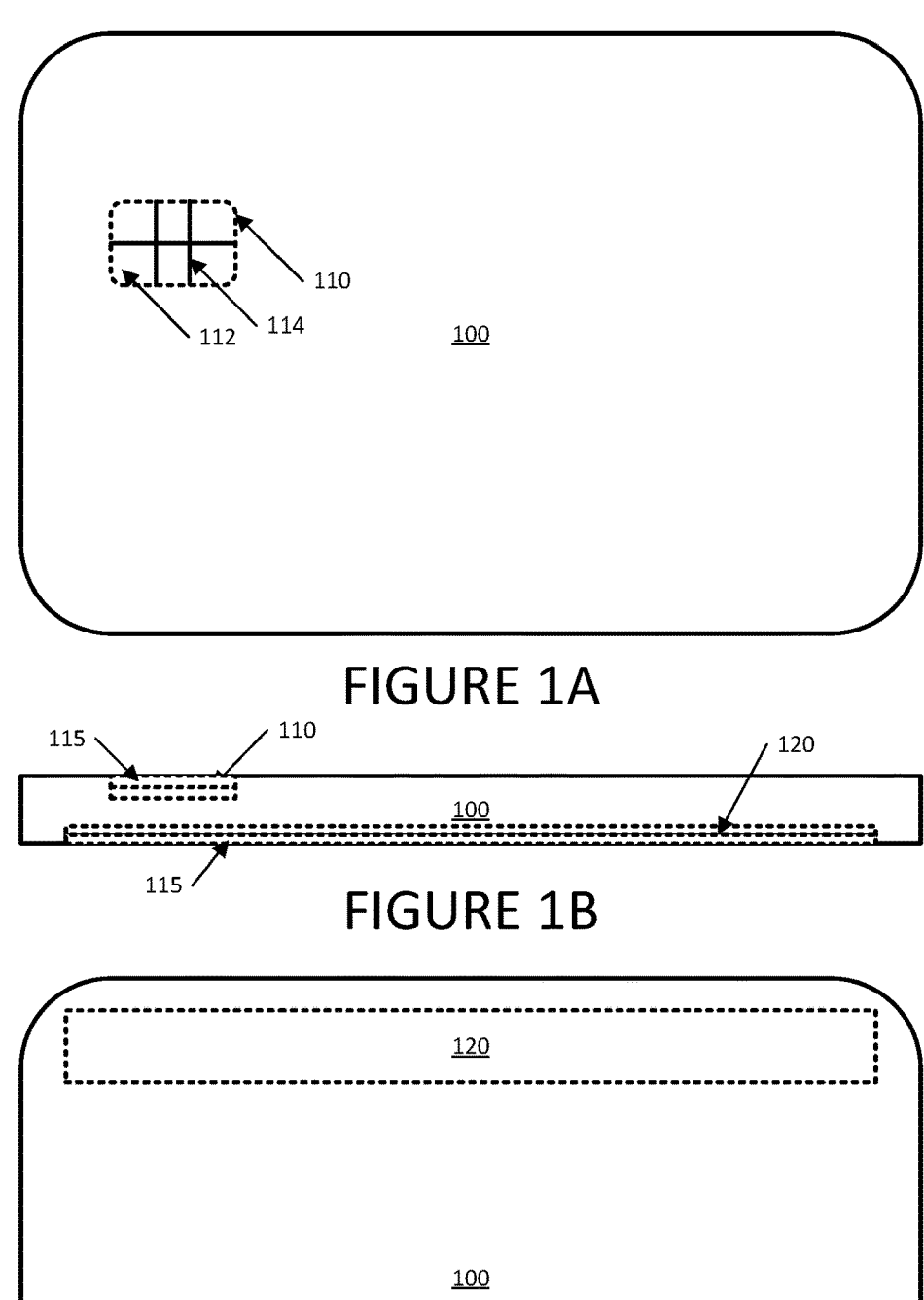
FIGS. 1A, 1B, and 1C depict a transaction card with a covered chip according to an embodiment.

Transaction cards are disclosed. In embodiments, the EMV chip may be "hidden" under a layer of a conductive material, such as a formulation of ceramic, resin, etc. so that the EMV chip can make electrical contact with a card reader.

In embodiments, the conductive material may be separated into a plurality of conductive "pads" that provide conductivity between the chip that is below the surface of the transaction card and the surface of the transaction card. The conductive pads may be separated by, for example, laser etching, the inclusion of an insulator, etc.

It should be noted that any sort of card that may include electrical contacts on its surface may be within the scope of this disclosure. Examples of such cards include credit cards, debit cards, access cards, etc.

In embodiments, the magnetic strip may also be hidden under a thin layer of conductive material so that the magnetic strip may be read by a card reader.

In embodiments, the resulting transaction card may have an embedded chip, antenna, and/or magnetic strip that are invisible to the naked eye. Because the chip is not visible, the transaction card may include graphics or a molded or stamped indicator to show the direction in which the transaction card should be inserted into a card reader.

In one embodiment, a transaction card may be created using a ceramic blank with one or more voids for inserting a chip and an antenna. The inserted chip and antenna may then have a thin layer of ceramic material layered over them, thereby bonding the chip and antenna to the blank.

In one embodiment, a transaction card may be printed using 3D printing or similar techniques (e.g., computer numerical control (CNC) printing, etc.). For example, the transaction card may be printed with voids and the antenna and chip may be provided in the voids; as another example, the antenna and/or chip may be provided during printing and printing may continue around the antenna and/or chip. The printing process may provide supports or inserts to guide the placement of the antenna and/or chip.

In one embodiment, an antenna may be printed using 3D printing or similar during the printing of the transaction card.

In another embodiment, two ceramic blanks, each having a void and a channel for the antennas, may be bound together. The antennas may be inserted, printed, etc. into one of the voids before the blanks are bound together.

In another embodiment, to manufacture the transaction card, the chip and antenna may be arranged and held on a floating mount that allows ceramic material to be layered in and around them. The ceramic material may also be poured around the chip and antenna using, for example, a slip casting or other technique.

In another embodiment, a transaction card may be made of a resin. For example, the transaction card may include multiple layers of materials such as True Blue (YInMn) or a ceramic. Examples of ceramics may include Alumina, Zirconia, Silicon Carbide, Aluminum Nitride, Silicon Nitride, etc. Any of these materials may be combined with resin to create a material having a unique durability and/or design. The chip and antenna may be arranged and held on a floating mount that allows the material to be layered around it or poured in. Ultraviolet light hardening may be used to help create color and bind materials together in a card form factor.

In another embodiment, a transaction card may include a toggle switch that disconnects the antenna when not in use. This increases security as the user can choose when the antenna is active, thereby reducing or eliminating the possibility of the transaction card being read or scanned by a bad actor.

For example, a button may enable the antenna when depressed.

In another embodiment, the switch may comprise a conductive material in which the user's touch may complete the connection and actuate the switch.

Because the antenna only functions when the switch is activated, embodiments may provide a dual function transaction card. The chip may be used with one account, and the NFC with another. Thus, the user may select which account to use based on the manner in which the transaction card is presented to the point-of-sale device.

In addition, the back of the transaction card may include a dual magstripe allowing both to function during a swipe, dip or tap.

In one embodiment, at least part of the transaction card may be embedded with a light reactive material that causes the transaction card to change colors when it is removed from a wallet, a carrier, etc. and exposed to light or other energy. This may be a passive change to all or part of the transaction card, or it may be triggered by a combination of light and energy received from the dip or tap.

Referring to FIGS. 1A, 1B, and 1C, a transaction card with a hidden chip is disclosed according to an embodiment. Transaction card 100 may include a substrate of any suitable material, including ceramics, plastics, metals, etc. In one embodiment, chip 110, which may be an EMV chip or similar, may be inserted into a void in transaction card 100 during manufacture, and may be located below a top surface of the substrate. Layer of conductive material 115, such as a ceramic, a resin, a metal, etc. may be layered over chip 110 so that chip 110 is not visible to the eye. The material that is layered over chip 110 may be the same material that is used for the rest of card 100, or it may be a different material.

Although layer of conductive material 115 is depicted as a separate element in FIG. 1B, it should be noted that this is for illustrative purposes only. Layer of conductive material 115 may be the same material as the substrate, or it may be a different material that may be added in a void during manufacture.

The conductive material may be separated into a plurality of pads 112, and each pad may be electrically insulated by insulating material 114 from the others so that chip 110 may be read by a card reader.

In one embodiment, magnetic strip 120 may also be covered by conductive material 115 such that magnetic strip 120 may be read by a card reader. Magnetic strip 120 may be located below a bottom surface of the substrate of transaction card 100.

In one embodiment, the contacts on chip 110 may be replaced with a material that may be the same as the substrate. For example, the contacts may be replaced with a conductive material.

Examples of a conducive material include Silicon Carbide, titanium nitride, and tungsten carbide. Other conductive materials may be used as is necessary and/or desired.

Figure 2A:
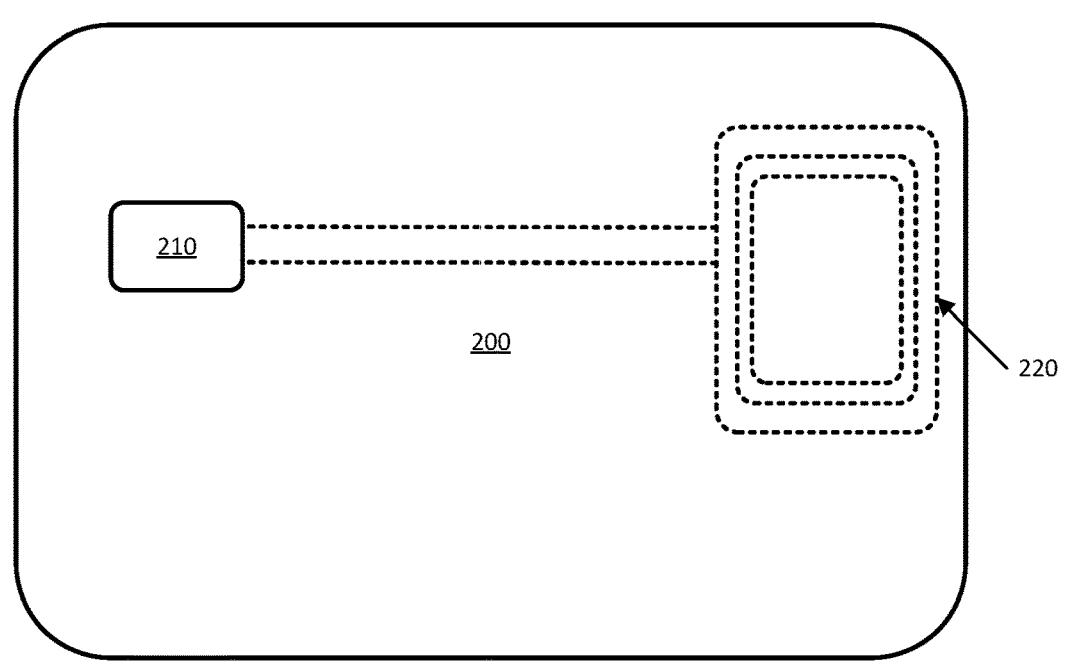
FIGS. 2A and 2B depict a 3D printed transaction card according to an embodiment.
Figure 2B:
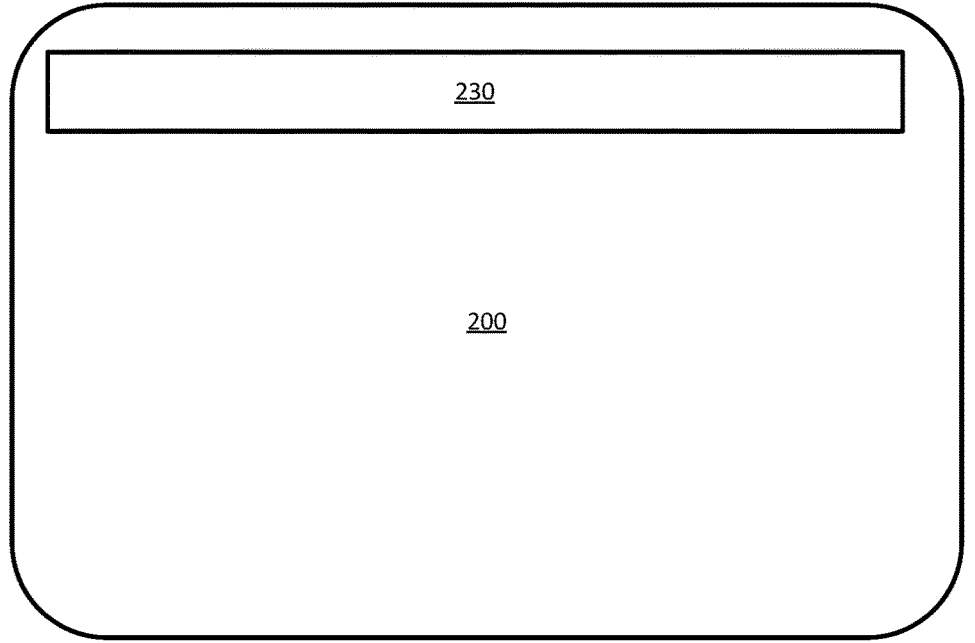

Referring to FIGS. 2A and 2B, a 3D printed transaction card is disclosed according to an embodiment. Transaction card 200 may be printed using, for example 3D printing, CNC printing, etc., using any suitable substrate (e.g., resin, metal, etc.). During printing, void 210 may be left for a chip (not shown), and antenna 220 may be printed such that antenna 220 is below the surface of transaction card 200. The chip may be secured in void 210 and connected to antenna 220.

In one embodiment, void 210 may have a sufficient depth such that the chip may be covered with a conductive material.

In one embodiment, void 230 may be provided for a magnetic strip (not shown), which may be inserted into void 230. The magnetic strip may also be covered with a conductive material as is necessary and/or desired.

In another embodiment, transaction card 200 may be a blank that may be formed from stamping a substrate. One blank may be used for transaction card 200, or two blanks—a front and a back, for example—may be created and then bound together. Antenna 220 may be inserted or formed into one of the blanks, and the chip and magnetic strip may also be inserted into voids 210 and 230, respectively.

Figure 3:
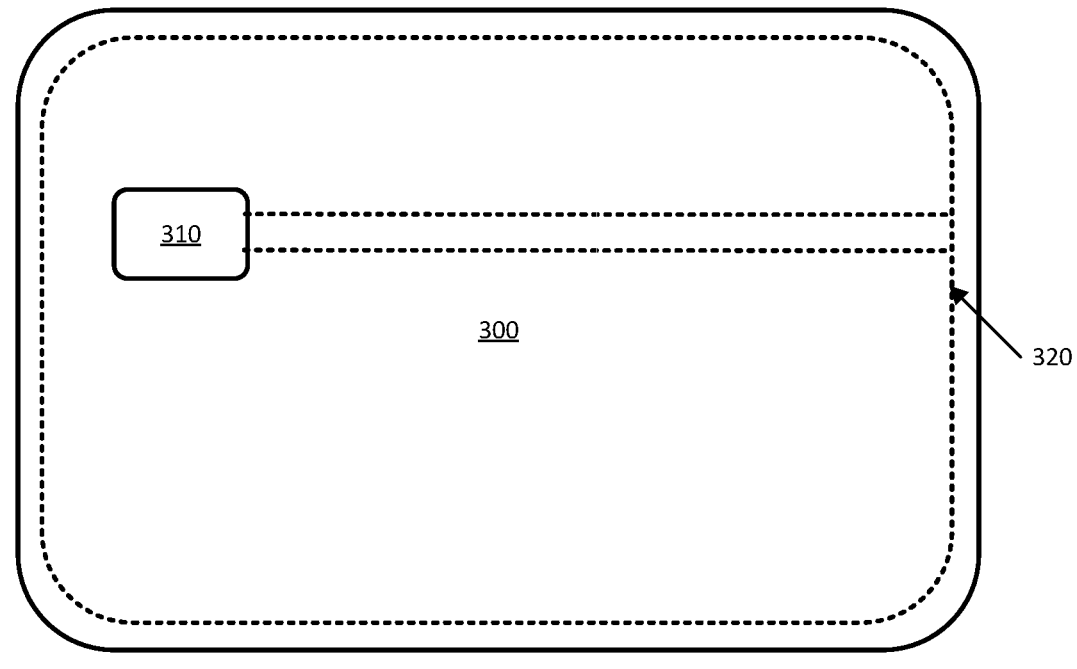
FIG. 3 depicts a transaction card with an antenna along its periphery according to an embodiment.

Referring to FIG. 3, a transaction card with an antenna along its periphery is disclosed according to an embodiment.

Transaction card 300 may include chip 310, which may be on the surface of transaction card 300 or may be covered by a conductive material, and may be connected to antenna 320. Antenna 320 may be provided along the periphery of transaction card 300 to reduce interference caused by the substrate (e.g., if the substrate is metal).

Figure 4:
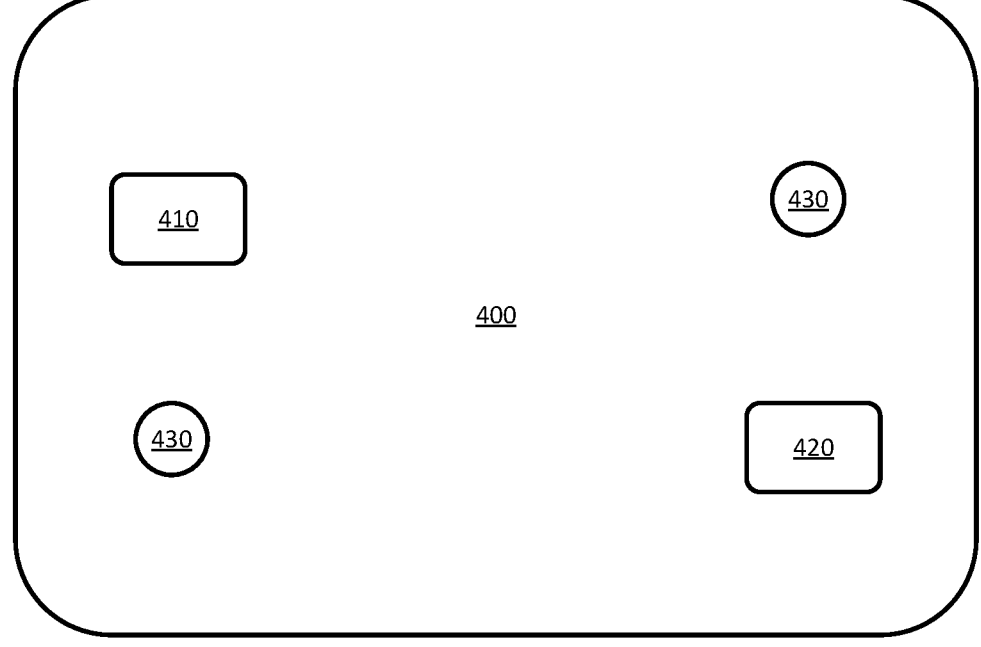
FIG. 4 depicts a transaction card with security features according to an embodiment.

Referring to FIG. 4, a transaction card with security features is provided according to an embodiment. Card 400 may include a plurality of chips 410, 420. Each chip may be oriented so that card 400 may be inserted into a card reader on multiple ends.

Chips 410 may be provided with one or more switches 430. Each switch 430 may electrically couple one of chips 410 or 420 to an antenna (not shown). For example, if two switches 430 are provided, neither chip 410, 420 may be electrically coupled to the antenna. Once the respective switch 430 is actuated, the chip associated with the actuated switch 430 may be electrically coupled to the antenna.

In another embodiment, if one switch 430 is provided, one of the chips may be electrically coupled to the antenna when switch 430 is not actuated. When switch 430 is actuated, the other chip may be electrically coupled to the antenna.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope. Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A transaction card, comprising:
a substrate having a top surface and a bottom surface;
a chip comprising a plurality of electrical contacts and positioned in a first void in the top surface of the substrate; and
a first conductive material provided in the first void and covering the plurality of electrical contacts of the chip, wherein the first conductive material provides an electrical connection to the chip such that the chip is readable by a chip reading device;
wherein the chip is not visible from the top surface of the substrate.

2. The transaction card of claim 1, wherein the first conductive material comprises a plurality of pads, each of the plurality of pads is associated with one of the plurality of electrical contacts.

3. The transaction card of claim 2, wherein the plurality of pads are separated by an insulating material.

4. The transaction card of claim 1, further comprising:
a magnetic strip provided in a second void in the bottom surface of the substrate; and
a second conductive material provided in the second void and covering the magnetic strip, wherein the second conductive material provides an electrical connection to the magnetic strip such that the magnetic strip is readable by a magnetic strip reading device;
wherein the magnetic strip is not visible from the bottom surface of the substrate.

5. The transaction card of claim 1, further comprising an antenna between the top surface and the bottom surface of the substrate in electrical communication with the chip.

6. The transaction card of claim 1, wherein the first conductive material comprises Silicon Carbide, titanium nitride, or tungsten carbide.

7. A transaction card, comprising:
a substrate having a top surface and a bottom surface;
a chip positioned in a void in the top surface of the substrate;

an antenna positioned between the top surface and the bottom surface of the substrate at a periphery of the transaction card in communication with the chip; and a conductive material provided in the void and covering a plurality of electrical contacts of the chip, wherein the conductive material provides an electrical connection to the chip such that the chip is readable by a chip reading device.

8. The transaction card of claim 7, wherein the substrate comprises a first half and a second half that are bound together.

9. The transaction card of claim 8, wherein the first half and the second half are formed by three-dimensional printing.

10. The transaction card of claim 9, wherein the antenna is three-dimensional printed on to one of the first half or the second half.

11. The transaction card of claim 8, wherein the first half and the second half are formed by stamping.

12. The transaction card of claim 7, further comprising a magnetic strip positioned on the bottom surface of the substrate.

13. The transaction card of claim 12, wherein the magnetic strip is positioned in a void in the bottom surface of the substrate.

14. A transaction card, comprising:

a substrate having a top surface and a bottom surface;

a first chip positioned in the substrate;

a second chip positioned in the substrate;

an antenna positioned between the top surface and the bottom surface of the substrate; and a first switch that electrically connects the first chip to the antenna in a first position, and electrically disconnects the first chip from the antenna in a second position, and electrically connects the second chip to the antenna in the second position, and electrically disconnects the second chip from the antenna in the first position.

15. The transaction card of claim 14, wherein the first position comprises a non-actuated position, and the second position comprises an actuated position.

16. The transaction card of claim 14, wherein the first chip is provided on the top surface of the substrate, and the second chip is provided on the bottom surface of the substrate.

17. The transaction card of claim 14, further comprising a second switch that electrically connects the second chip to the antenna in a first position, and electrically disconnects the second chip from the antenna in a second position.

18. The transaction card of claim 17, wherein the first position comprises a non-actuated position, and the second position comprises an actuated position.

* * * * *